United States Patent Office 2,809,201
Patented Oct. 8, 1957

2,809,201

BENZOFUROHEXAHYDROPYRIDINES AND PREPARATION THEREOF

Charles Frederick Koelsch, St. Paul, Minn.

No Drawing. Application July 27, 1954,
Serial No. 446,163

25 Claims. (Cl. 260—294.7)

This invention relates to novel benzofurohexahydropyridines, intermediates thereof, and a process for their preparation. More particularly the invention relates to compounds having the formula

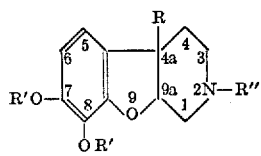

wherein R is a hydrocarbon group free of ethylenic or acetylenic unsaturation, and R' and R'' are lower-alkyl groups.

My new compounds are useful as pharmacodynamic agents, and in particular they have analgesic activity.

In the above general formula R represents a hydrocarbon radical free of ethylenic (olefinic) or ocetylenic (triple bond) unsaturation. The group preferably contains from one to about eight carbon atoms, and thus includes such groups as lower-alkyl, for example, methyl, ethyl, propyl, isopropyl, butyl, isobutyl, pentyl, hexyl, heptyl, octyl and the like; cycloalkyl, for example, cyclohexyl cyclopentyl, 4-methylcyclohexyl, 2,4-dimethylcyclohexyl, cycloheptyl and the like; cycloalkyl-lower-alkyl, for example, cyclohexylmethyl, cyclohexylethyl, cyclopentylmethyl, cyclopentylethyl and the like; aralkyl, for example, benzyl, p-methylbenzyl, phenylethyl and the like; and monocyclic aryl, for example, phenyl, p-tolyl, p-ethylphenyl, 2,4-dimethylphenyl and the like. Accordingly, the structure of the hydrocarbon group R is not critical, except that groups containing olefinic or acetylenic unsaturation are to be avoided since these are likely to promote competing side reactions during the course of the synthetic method outlined below, producing mixtures containing unwanted by-products.

In the above general formula R' and R'' each represent lower-alkyl groups. The two R'''s are preferably the same but R' and R'' can be different lower-alkyl groups. R' and R'' contain from one to about four carbon atoms, thus including methyl, ethyl, propyl, isopropyl, butyl, isobutyl, secondary-butyl and tertiary-butyl.

The new compounds are prepared according to the following flow sheets:

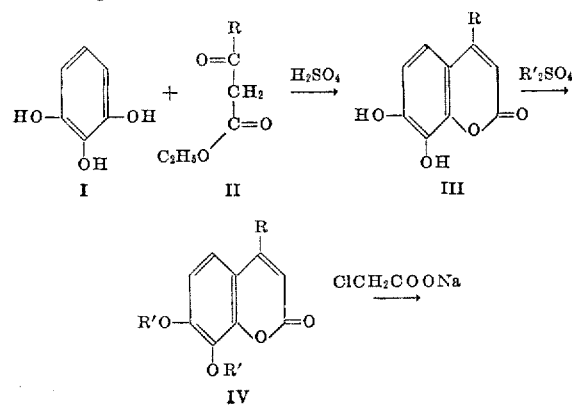

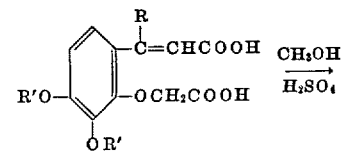

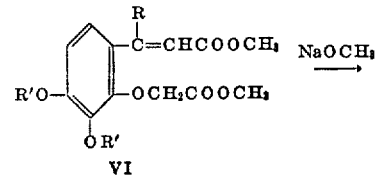

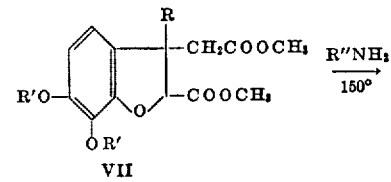

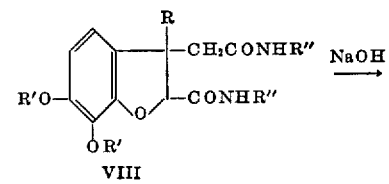

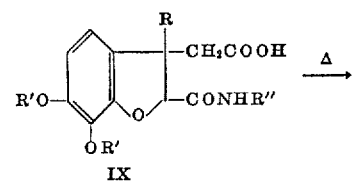

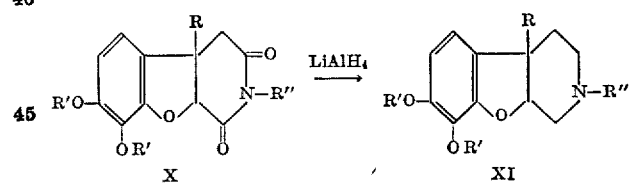

Pyrogallol (I) is heated with a lower-alkyl acylacetate (II) in the presence of sulfuric acid to give a 7,8-dihydroxy-4-R-coumarin (III). Compound III is then alkylated with a lower-alkyl sulfate, R'₂SO₄, under alkaline conditions, producing a 7,8-di-lower-alkoxy-4-R-coumarin (IV). Compound IV when heated with sodium chloroacetate, followed by acidification of the resulting product, is converted to a 2-carboxymethoxy-3,4-di-lower-alkoxy-β-R-cinnamic acid (V). The cinnamic acid (V) is then methylated with methyl alcohol in the presence of sulfuric acid to give a methyl 2-carbomethoxymethoxy-3,4-di-lower-alkoxy-β-R-cinnamate (VI). Compound VI when treated with sodium methoxide is converted to a methyl 2-carbomethoxy - 6,7 - di - lower - alkoxy-3-R-coumaran-3-acetate (VII). The latter compound is then treated with an alcoholic solution of a lower-alkylamine, thus producing a di-(N-lower-alkylamine) of a 2-carboxy-6,7-di-lower-alkoxy-3-R-coumaran-3-acetic acid (VIII). Compound VIII is then selectively hydrolyzed with sodium hydroxide solution to give a half-amide, 2-(N-lower-alkylcarbamyl)-6,7-di-lower-alkoxy-3-R-coumaran-3-acetic acid (IX). Compound IX is cyclized by heating, optionally in the presence of acetic anhydride, to give an N-lower-alkylimide of 2-carboxy-6,7-di-lower-alkoxy-3-R-coumaran-3- acetic acid (X). The final step is a reduction of compound X with lithium aluminum hydride in an inert solvent to give the desired 7,8-di-lower-alkoxy-2-lower-alkyl-4a - R - benzofuro[2,3-c]-1,2,3,4,4a,9a-hexahydropyridine (XI). These reactions are described in detail in the examples given below.

The new benzofurohexahydropyridine derivatives are most conveniently used in the form of water-soluble, non-toxic acid-addition salts and these salts are within the purview of the invention. The acids which can be used to prepare acid-addition salts are preferably those which produce when combined with the free base, salts whose anions are relatively innocuous to the animal organism in therapeutic doses of the salts, so that the beneficial physiological properties inherent in the free base are not vitiated by side effects ascribable to the anions. Appropriate acid-addition salts are those derived from mineral acids such as hydrochloric acid, hydrobromic acid, hydriodic acid, nitric acid, phosphoric acid and sulfuric acid; and organic acids such as acetic acid, citric acid, tartaric acid, lactic acid, and the like, giving the hydrochloride, hydrobromide, hydriodide, nitrate, phosphate or acid phosphate, sulfate or bisulfate, acetate, citrate or acid citrate, tartrate or bitartrate, and lactate salts, respectively.

The following examples will further illustrate the invention.

EXAMPLE 1

(a) *7,8-dihydroxy-4-phenylcoumarin* (III; R=C₆H₅)

To a warm suspension of 126 g. (1.0 mole) of finely pulverized pyrogallol (I) in 192.2 g. (1.0 mole) of ethyl benzoylacetate (II; R=C₆H₅) was added 1 liter of 75% sulfuric acid. After the reaction mixture was heated on the steam bath to 55° C., the reaction mixture slowly thickened and stirring was continued till the entire mass solidified. Approximately 1.5 liters of cold water was added and the suspension was cooled to room temperature. The yellow solid was collected on a filter, washed well with water and recrystallized from dilute ethanol. The 7,8-dihydroxy-4-phenylcoumarin monohydrate which settled out as pale yellow prismatic needles and weighed about 195 g. had no definite melting point. The water of crystallization was removed on heating in an oven at 120° C. for twenty minutes. The resulting 7,8-dihydroxy-4-phenylcoumarin melted at 190–195.5° C.

(b) *7,8-dimethoxy-4-phenylcoumarin* (IV; R=C₆H₅, R'=CH₃)

To a well stirred mixture of 160.0 g. (0.588 mole) of 7,8 - dihydroxy - 4 - phenylcoumarin monohydrate (III; R=C₆H₅), 163.2 g. (1.296 moles) of dimethyl sulfate and 50 ml. of water there was added a solution of 62.4 g. (1.296 moles) of potassium hydroxide dissolved in 800 ml. of water over a period of three to four minutes. The resulting suspension was stirred for fifteen minutes before an additional 32.6 g. (0.26 mole) of dimethyl sulfate and a solution of 12.4 g. (0.26 mole) of potassium hydroxide in 200 ml. of water were introduced. After stirring for another ten minutes, an additional 300 ml. of 5% potassium hydroxide was added and the stirring was continued. The light yellow solid was collected on a filter and washed with 2% potassium hydroxide solution until the washings were clear. After further washing with water, the product was recrystallized from dilute ethanol. The yield of 7,8-dimethoxy-4-phenylcoumarin (IV; R=C₆H₅, R'=CH₃) which settled out as nearly colorless prisms and melted at 141.0–142.0° C., was 119.5 g. (72.0% of theory).

*Analysis.*—Calcd. for C₁₇H₁₄O₄: C, 72.3; H, 5.00. Found: C, 72.2; H, 5.15.

The dimethyl ether was also prepared by treating a boiling acetone solution of the dihydroxy coumarin with methyl iodide in the presence of potassium carbonate.

(c) *2-carboxymethoxy-3,4-dimethoxy-β-phenylcinnamic acid* (V; R=C₆H₅, R'=CH₃)

A solution of 141.1 g. (0.50 mole) of 7,8-dimethoxy-4-phenylcoumarin (IV; R=C₆H₅, R'=CH₃) in a hot mixture of 500 ml. of 10% sodium hydroxide solution was treated with 150 g. (1.30 moles) of sodium chloroacetate. Boiling was continued for one hour, and then 500 ml. of alcohol and water was removed by distillation. To the slightly cooled suspension were added 140.0 g. (3.5 moles) of sodium hydroxide and 140 g. (1.50 moles) of chloroacetic acid. The resulting solution was refluxed for one hour. Another 140 g. of sodium hydroxide and 140 g. of chloroacetic acid were then added, and the solution was refluxed for another hour.

The cooled basic solution was treated with concentrated hydrochloric acid diluted with an equal volume of water to precipitate the product and unchanged coumarin. The solid was collected on a filter, transferred to a beaker and stirred with 10% hydrochloric acid while warming the suspension to 55° C. (steam bath). After filtration, the solid was next stirred with warm 5% sodium carbonate solution. The undissolved portion was collected by filtration and consisted of recovered 7,8-dimethoxy-4-phenylcoumarin (25.7 g. after recrystallization from dilute ethanol). The basic filtrate was acidified to precipitate the diacid. The solid which was collected on a filter, was washed well with water and was allowed to dry. The crude 2-carboxymethoxy-3,4-dimethoxy-β-phenylcinnamic acid (V; R=C₆H₅, R'=CH₃) weighed 100.7 g. (58.5% yield, based on unrecovered coumarin). A portion of this material recrystallized from dilute ethanol melted at 184.5–186.0° C.

*Analysis.*—Calcd. for C₁₉H₁₈O₇: C, 63.7; H, 5.06. Found: C, 63.8; H, 5.21.

(d) *Methyl 2-carbomethoxymethoxy-3,4-dimethoxy-β-phenylcinnamate* (VI; R=C₆H₅, R'=CH₃)

A solution of 122.5 g. (0.34 mole) of crude 2-carboxymethoxy-3,4-dimethoxy-β-phenylcinnamic acid in 500 ml. of methanol was refluxed with 50 ml. of concentrated sulfuric acid for one hour. The cooled solution was poured over crushed ice whereupon an oil separated from solution. The product, which solidified on standing, was transferred to a beaker and stirred well with 200 ml. of 5% sodium carbonate solution. The crude diester, which was collected on a filter, was then redissolved in methanol, boiled with carbon black for ten minutes and filtered through "filter cel." The pure methyl 2-carbomethoxymethoxy-3,4-dimethoxy-β-phenylcinnamate which separated from the cooled methanolic solution weighed 81.5 g. (62.0% of theory) and melted at 90.5–92.0° C.

*Analysis.*—Calcd. for C₂₁H₂₂O₇: C, 65.3; H, 5.74. Found: C, 65.3; H, 5.94.

(e) *Methyl 2-carbomethoxy-6,7-dimethoxy-3-phenylcoumaran-3-acetate* (VII; R=C₆H₅, R'=CH₃)

A melt of 60.8 g. (0.157 mole) of methyl 2-carbomethoxymethoxy-3,4-dimethoxy-β - phenylcinnamate (VI; R=C₆H₅, R'=CH₃) was supercooled to 45° C. Into this melt was stirred a solution of 0.75 g. (0.033 gram-atom) of sodium in 12 ml. of absolute methanol. The color of the mixture changed to bright yellow as the temperature rose sharply to 90° C. The stirring was continued till the reaction mixture had cooled to room temperature. After neutralization with glacial acetic acid, 200 ml. of diethyl ether was added causing the separation of a white solid. This solid was collected by filtration and washed well with 5% sodium carbonate solution and water; when dry it weighed 47.5 g. The ether solution was extracted with aqueous sodium carbonate and then water. The ether solution was dried and concentrated, and the residual oil was crystallized from a methylene chloride-ligroin (B. P. 30–60° C.) mixture. The light yellow solid weighed 10.2 g. The combined weight of methyl 2-carbomethoxy-6,7-dimethoxy-3-phenylcoumaran-3-acetate (VII; R=C₆H₅, R'=CH₃) was 57.7 g. (94.8% of theory). The diester (VII) formed colorless prisms when recrystallized from ethyl acetate-ligroin (B. P. 30–60° C.) and melted at 107.5–108.5° C.

*Analysis.*—Calcd. for $C_{21}H_{22}O_7$: C, 65.3; H, 5.74. Found: C, 65.2; H, 5.73.

Another procedure to isolate the solid diester (VII) was also employed. After the neutralization with glacial acetic acid and addition of ether (to induce crystallization) the solvent was removed by evaporation. The remaining solid was then stirred with 5% sodium carbonate to remove acidic products. The solid diester was collected on a filter, washed well with cold water, and, when dry, was recrystallized from ethyl acetate-ligroin (B. P. 30–60° C.).

*(f) Di-(N-methylamide) of 2-carboxy-6,7-dimethoxy-3-phenylcoumaran-3-acetic acid (VIII; R=C₆H₅, R' and R''=CH₃)*

1. WITH ETHANOL AS SOLVENT

In the glass liner of an autoclave was placed 25.0 g. (0.065 mole) of methyl 2-carbomethoxy-3-phenyl-6,7-dimethoxy-coumaran-3-acetate (VII; R=C₆H₅, R'=CH₃) and 70 g. (0.445 mole) of a 19.7% solution of methylamine dissolved in absolute ethanol. The autoclave was heated for four hours at 150° C. After the alcohol was removed at a reduced pressure, the residue was treated with 100 ml. of 2.5% sodium hydroxide solution. The undissolved solid was collected on a filter, washed well with water and air dried. The resulting di-(N-methylamide) of 2-carboxy-6,7-dimethoxy-3-phenylcoumaran-3-acetic acid (10.5 g., 42.2% of theory) was recrystallized from chloroform-ligroin (B. P. 30–60° C.) and melted at 200.5–201.5° C.

*Analysis.*—Calcd. for $C_{21}H_{24}O_5N_2$: O, 65.6; H, 6.29; N, 7.29. Found: O, 65.5; H, 6.29; N, 7.59.

A mixture of solid acidic products, from which no pure compound could be isolated was obtained from the basic extracts.

2. WITH ETHER AS SOLVENT

In the glass liner of an autoclave was placed 35.0 g. (0.098 mole) of methyl 2-carbomethoxy-6,7-dimethoxy-3-phenylcoumaran-3-acetate (VII, R=C₆H₅, R'=CH₃) and 175 ml. of a 16.6% solution of methylamine in anhydrous ether. The autoclave was heated to 150° C., heating was discontinued, and the autoclave allowed to cool to room temperature (approximately three hours). The residue which remained after the solvent and excess methylamine were removed by distillation was boiled with 150 ml. of ethyl acetate. The di-(N-methylamide), 12.5 g. (35.7% of theory), was filtered from the cooled ethyl acetate and after recrystallization from chloroform-ligroin (B. P. 60–68° C.), melted at 200.5–201.5° C.

*(g) 2 - (N - methylcarbamyl) - 6,7 - dimethoxy-3-phenyl-coumaran-3-acetic acid (IX; R=C₆H₅, R' and R''=CH₃)*

A suspension of 4.0 g. (0.01 mole) of the di-(N-methylamide) of 2-carboxy-6,7-dimethoxy-3-phenylcoumaran-3-acetic acid (VIII; R=C₆H₅, R' and R''=CH₃) in a solution of 0.42 g. (0.01 mole) of sodium hydroxide in 25 ml. of water was refluxed for three hours. Much foaming occurred during the early stages of the hydrolysis as methylamine was evolved. To the cooled clear solution was added hydrochloric acid to precipitate the acidic material. The solid was collected on a filter, washed well with water and was allowed to air dry. The 2-(N-methylcarbamyl)-6,7-dimethoxy-3-phenylcoumaran-3-acetic acid (3.0 g., 75.0% of theory) thus obtained was recrystallized from ethyl acetate and melted at 166.5–168.0° C.

*Analysis.*—Calcd. for $C_{20}H_{21}O_6N$: C, 64.7; H, 5.70. Found: C, 64.9; H, 5.66. Neut. equiv. calcd.: 371.4. Found: 380.

*(h) N-methylimide of 2-carboxy-6,7-dimethoxy-3-phenyl-coumaran-3-acetic acid (X; R=C₆H₅, R' and R''=CH₃)*

The cyclization of 2-(N-methylcarbamyl)-6,7-dimethoxy-3-phenylcoumaran-3-acetic acid (IX; R=C₆H₅, R' and R''=CH₃) was effected by refluxing 1.9 g. (0.005 mole) of the material with 20 ml. of acetic anhydride for one hour. The excess anhydride was removed at a reduced pressure and the residue was dissolved in hot ethanol. The N-methylimide of 2-carboxy-6,7-dimethoxy-3-phenylcoumaran-3-acetic acid (X; R=C₆H₅, R' and R''=CH₃) which separated from the cooled ethanol as white prisms, weighed 1.35 g. (71.0% of theory) and melted at 133.0–134.0° C.

*Analysis.*—Calcd. for $C_{20}H_{19}O_3N$: C, 68.0; H, 5.42; N, 3.96. Found: C, 67.8; H, 5.42; N, 4.26.

A 78.2% yield of N-methylimide (X) was obtained when 0.05 g. of the N-methyl-half-amide (IX) was allowed to remain in an oven at 120° C. for 24 hours.

*(i) 7,8-dimethoxy-2-methyl-4a-phenylbenzofuro[2,3-c]-1, 2,3,4,4a,9a-hexahydropyridine (XI; R=C₆H₅, R' and R''=CH₃)*

Into a 3-necked flask equipped with a stirrer, dropping funnel and water condenser protected by a calcium chloride drying tube was placed 0.91 g. (0.024 mole) of powdered lithium aluminum hydride and 75 ml. of anhydrous ether. To this well stirred suspension was added a solution of 3.53 g. (0.01 mole) of the N-methylimide of 2-carboxy-6,7-dimethoxy-3-phenylcoumaran - 3 - acetic acid (X; R=C₆H₅, R' and R''=CH₃) in 75 ml. of dry benzene. The addition was accompanied by mild ether reflux and the concurrent formation of a white flocculent precipitate. After the suspension was refluxed for two hours, water was carefully added to decompose the excess lithium aluminum hydride.

The ether-benzene solution, which was decanted free of the white lithium aluminate, was extracted with three 50 ml. portions of 15% hydrochloric acid. The product, 2.45 g. (75.4% of theory), separated from the aqueous solution upon the addition of base. The amine slowly solidified in the basic medium and a dried sample of the 7,8-dimethoxy-2-methyl-4a - phenylbenzofuro[2,3 - c]-1,-2,3,4,4a,9a-hexahydropyridine thus obtained melted at 85.0–95.0° C.

7,8-dimethoxy-2-methyl - 4a - phenylbenzofuro[2,3-c]-1,2,3,4,4a,9a-hexahydropyridine was obtained in the form of its colorless crystalline hydrobromide when a solution of the free base in absolute ethanol was titrated just to the acid side with a solution of anhydrous hydrogen bromide in absolute ethanol and anhydrous ether added to the point of turbidity. The 7,8-dimethoxy-2-methyl-4a - phenylbenzofuro[2,3-c] - 1,2,3,4,4a,9a - hexahydropyridine hydrobromide after recrystallization from ethanol-ether melted at 210.0–213.0° C. with decomposition.

*Analysis.*—Calcd. for $C_{20}H_{24}O_3NBr$: C, 59.1; H, 5.95. Found: C, 58.8; H, 5.70.

7,8-dimethoxy-2-methyl-4a-phenylbenzofuro[2,3-c]-1,2, 3,4,4a,9a-hexahydropyridine was obtained in the form of its colorless crystalline hydrochloride when the free base was treated with anhydrous hydrogen chloride according to the manipulative procedure given above for the hydrobromide. The hydrochloride salt melted at 215.0–227.0° C. with decomposition.

*Analysis.*—Calcd. for $C_{20}H_{24}O_3NCl$: C, 66.4; H, 6.68; N, 3.87. Found: C, 66.5; H, 6.97; N, 3.85.

*Example 2*

*(a) 7,8-dihydroxy-4-methylcoumarin (III; R=CH₃)*

To a cold well-stirred suspension of 126.1 g. of finely pulverized pyrogallol (I) in 130.1 g. (1.0 mole) of ethyl acetoacetate (II; R=CH₃) was added 1 liter of cold 75% sulfuric acid. The acid was added at such a rate that the reaction temperature did not exceed 40–45° C. The resulting clear light red solution was slowly heated (steam bath) to 55° C., after which 2 liters of cold water was carefully added to precipitate the light yellow product. The suspension was cooled to 10° C. and the solid collected by filtration and washed well with cold water. The 7,8-dihydroxy-4-methylcoumarin thus obtained weighed 184.0 g. (96.0% of theory) and when recrystallized from dilute ethanol melted at 236.0–236.5° C.

(b) *7,8-dimethoxy-4-methylcoumarin* (IV; R and R'=CH₃)

To a well stirred mixture of 144.1 g. (0.75 mole) of 4-methyl-7,8-dihydroxycoumarin (III; R=CH₃), 208.1 g. (1.65 moles) of dimethyl sulfate, and 50 ml. of water there was added a solution of 92.6 g. (1.65 moles) of potassium hydroxide dissolved in 800 ml. of water over a period of 3–4 minutes. The resulting suspension was stirred for five minutes before introducing an additional 41.6 g. (0.33 mole) of dimethyl sulfate and a solution of 18.5 g. (0.33 mole) of potassium hydroxide in 250 ml. of water. Five minutes later a final 500 ml. of 5% potassium hydroxide solution was introduced and the basic suspension was stirred for fifteen minutes. The tan solid was collected on a filter and washed well with cold water. The 7,8-dimethoxy-4-methylcoumarin (IV; R and R'=CH₃), after recrystallization from dilute ethanol, weighed 126.0 g. (75.5% of theory) and melted at 132.0–133.0° C.

(c) *2-carboxymethoxy-3,4-dimethoxy-β-methylcinnamic acid* (V; R and R'=CH₃)

A hot solution of 173.0 g. (0.78 mole) of 7,8-dimethoxy-4-methylcoumarin (IV; R and R'=CH₃) and 74 g. (1.85 moles) of sodium hydroxide in 370 ml. of water and 185 ml. of ethanol was treated with 109.5 g. (0.94 mole) of sodium chloroacetate. The solution was boiled for one hour and then 250 ml. of alcohol and water was removed by distillation. To the slightly cooled suspension was added concentrated hydrochloric acid diluted with an equal volume of water. The resulting oily suspension was warmed to 55° C. (steam bath), the suspension was then cooled, and solid sodium carbonate added to dissolve the acidic materials. Filtration yielded 63.7 g. of crude 7,8-dimethoxy-4-methylcoumarin. After the basic filtrate was acidified, the oily suspension was extracted with three 250 ml. portions of ether. The ether extracts, after extraction with water and drying over sodium sulfate, were concentrated by distillation. The residual 2-carboxymethoxy-3,4-dimethoxy-β-methylcinnamic acid (V; R and R'=CH₃) weighed 142.0 g. (79.4% crude yield) and was extremely difficult to crystallize. A portion of the material after repeated recrystallization from methyl acetate, melted at 176.5–177.5° C.

*Analysis.*—Calcd. for C₁₄H₁₆O₇: C, 56.8; H, 5.44. Found: C, 56.8; H, 5.57.

(d) *Methyl 2-carbomethoxymethoxy-3,4-dimethoxy-β-methylcinnamate* (VI; R and R'=CH₃)

A solution of 142.0 g. of crude 2-carboxymethoxy-3,4-dimethoxy-β-methylcinnamic acid in 450 ml. of methanol was refluxed with 45 ml. of concentrated sulfuric acid for one hour. The cooled solution was poured over crushed ice whereupon an oil separated from solution. The oil was extracted into three 250 ml. portions of ether. The combined extracts, after concentration to about 300 ml., were washed with 100 ml. of 5% sodium carbonate solution. To the ether, which was dried over sodium sulfate, was added ligroin (B. P. 30–60° C.) to the point of turbidity and the solution was cooled for several hours. The material which separated weighed 14.0 g. and proved to be 7,8-dimethoxy-4-methylcoumarin (IV; R and R'=CH₃).

The mother liquors from the 7,8-dimethoxy-4-methylcoumarin were concentrated and the residue was distilled. Methyl 2-carbomethoxymethoxy-3,4-dimethoxy-β-methylcinnamate (VI; R and R'=CH₃) distilled at 174.0–180.0° C./2.5–3.0 mm. and weighed 53.5 g. (30.5% over-all yield of alkylation and esterification based on unrecovered coumarin).

(e) *Methyl 2-carbomethoxy-6,7-dimethoxy-3-methylcoumaran-3-acetate* (VII; R and R'=CH₃)

Into 53.5 g. (0.17 mole) of 2-carbomethoxymethoxy-3,4-dimethoxy-β-methylcinnamate (VI; R and R'=CH₃) was stirred a solution of 0.86 g. (0.034 gram-atom) of sodium in 12.0 ml. of absolute methanol. The color of the mixture changed to bright red as the temperature rose sharply to 95° C. Stirring was continued till the temperature dropped to 35° C. After neutralization with 5 ml. of glacial acetic acid, the heavy oil was dissolved in 350 ml. of ether. Extraction with three 75 ml. portions of 5% sodium carbonate solution followed by three 50 ml. portions of water removed most of the intense color. The ether was removed by distillation and the water removed by adding benzene and distilling off the solvent. The methyl 2-carbo-methoxy-6,7-dimethoxy-3-methylcoumaran-3-acetate (VII; R and R'=CH₃) distilled at 175.0–180° C./0.75–1.0 mm. and weighed 42.8 g. (80.0% of theory). The diester crystallized with difficulty from chloroform-ligroin (B. P. 30–60° C.) and melted at 75.0–76.5° C.

*Analysis.*—Calcd. for C₁₆H₂₀O₇: C, 59.3; H, 6.22. Found: C, 59.5; H, 6.31.

(f) *Di-(N-methylamide) of 2-carboxy-6,7-dimethoxy-3-methylcoumaran-3-acetic acid* (VIII; R, R' and R''=CH₃)

Into 150 ml. of a 19.7% solution of methylamine in absolute ethanol (approximately 1.0 mole of methylamine) was dissolved 16.7 g. (0.05 mole) of methyl 2 - carbomethoxy - 6,7 - dimethoxy - 3 - methylcoumaran-3-acetate (VII; R and R'=CH₃). The amination was allowed to proceed for six days at room temperature after which the ethanol was removed at a reduced pressure and the residue was stirred with about 100 ml. of ethyl acetate. The undissolved solid was collected on a filter and weighed 3.0 g. (17.8% of theory). After recrystallization from chloroform-ligroin (B. P. 30–60° C). the di-(N-methylamide) of 2-carboxy-6,7-dimethoxy-3-methylcoumaran-3-acetic acid (VIII; R, R' and R''=CH₃) melted at 217.0–219.0° C.

*Analysis.*—Calcd. for C₁₆H₂₂O₅N₂: C, 59.6; H, 6.88; N, 8.69. Found: C, 59.4; H, 6.57; N, 8.96.

The ethyl acetate filtrate was boiled with activated charcoal for several minutes and filtered through "filtercel." The di-(N-methylamide) of 2-carboxy-6,7-dimethoxy-3-methylcoumaran-3-acetic acid (VIII; R, R' and R''=CH₃) which separated as a colorless solid when ligroin (B. P. 30–60° C.) was added to the point of turbidity weighed 7.0 g. (41.9% of theory) and melted at 159.0–160.5° C. This compound is a stereoisomer of the more sparingly soluble substance, M. P. 217–219° C., obtained above.

*Analysis.*—Calcd. for C₁₆H₂₂O₅N₂: C, 59.6; H, 6.88; N, 8.69. Found: C, 59.4; H, 6.88; N, 8.67.

A separation of the two isomers of the N-methyl diamide is not necessary for both give the same N-methyl-half-amide (IX; R, R' and R''=CH₃) on hydrolysis with base.

(g) *2-(N-Methylcarbamyl)-6,7-dimethoxy-3-methylcoumaran-3-acetic acid* (IX; R, R' and R''=CH₃)

1. OBTAINED FROM DI-(N-METHYLAMIDE), M. P. 217–219° C.

A suspension of 2.0 g. (0.006 mole) of the di-(N-methylamide) of 2-carboxy-6,7-dimethoxy-3-methylcoumaran-3-acetic acid (VIII; R, R' and R''=CH₃), M. 217–219° C., was refluxed with a solution of 0.25 g. (0.006 mole) of sodium hydroxide in 10 ml. of water for three hours. Slight frothing occurred as methylamine was evolved. The cooled solution was acidified with concentrated hydrochloric acid and the N-methyl-half-amide which settled from the well-cooled solution weighed 1.75 g. (91.0% crude yield). After repeated recrystallization from ethyl acetate-ligroin (B. P. 30–60° C.) the 2-(N-methyl - carbamyl) - 6,7 - dimethoxy - 3 - methylcoumaran-3-acetic acid (IX; R, R' and R''=CH₃) melted at 159.0–160.5° C.

Analysis.—Calcd. for $C_{15}H_{19}O_6N$: C, 58.2; H, 6.19. Found: C, 58.3; H, 6.31.

2. OBTAINED FROM DI-(N-METHYLAMIDE), M. P. 159–160.5° C.

An 84.1% yield of 2-(N-methylcarbamyl)-6,7-dimethoxy-3-methylcoumaran-3-acetic acid (IX; R, R' and R''=CH₃) was obtained when 4.0 g. of the di-(N-methylamide) of 2-carboxy-6,7-dimethoxy-3-methylcoumaran-3-acetic (VIII; R, R' and R''=CH₃), M. P. 159–160.5° C., was refluxed for three hours with an equimolar amount of sodium hydroxide dissolved in 15 ml. of water. A sample of the product, recrystallized from ethyl acetate-ligroin (B. P. 30–60° C.), melted at 159.0–160.5° C. and showed no depression when melted with a pure sample of the N-methyl-half-amide prepared from the di-(N-methylamide), M. P. 217–219° C.

(h) *N-methylimide of 2-carboxy-6,7-dimethoxy-3-methylcoumaran-3-acetic acid* (X; R, R' and R''=CH₃).

A solution of 4.3 g. (0.013 mole) of 2-(N-methylcarbamyl) - 6,7 - dimethoxy - 3 - methylcoumaran - 3 - acetic acid (IX; R, R' and R''=CH₃) in 20 ml. of acetic anhydride was refluxed for one hour. After the excess reageant was removed at reduced pressure, the residue was dissolved in hot ethanol. The 2-(N-methylcarbamyl) 6,7-dimethoxy-3-methylcoumaran-3-acetic acid (IX; R, R' and R''=CH₃) which settled from the cooled ethanol as colorless prisms weighed 3.15 g. (77.7% of theory) and melted at 177.0–178.5° C.

Anaylsis.—Calcd. for $C_{15}H_{17}O_5N$: C, 61.9; H, 5.88; N, 4.81. Found: C, 62.0; H, 5.96; N, 4.92.

(i) *7,8-dimethoxy-2,4a-dimethylbenzofuro[2,3-c]-1,2,3, 4,4a,9a-hexahydropyridine* (XI; R, R' and R''=CH₃)

Into a 3-necked flask equipped with a stirrer, dropping funnel and water condenser containing a calcium chloride drying tube was placed 4.1 g. (0.10 mole) of powdered lithium aluminum hydride and 800 ml. of dry ether. To this well-stirred suspension was added a solution of 13.1 g. (0.045 mole) of the N-methylimide of 2-carboxy-6,7-dimethoxy-3-methylcoumaran-3-acetic acid (X; R, R' and R''=CH₃) dissolved in 800 ml. of dry benzene. The addition was accompanied by mild ether reflux and the concurrent formation of a white flocculent precipitate. After the suspension was refluxed for two hours, water was carefully added to decompose the excess lithium aluminum hydride.

The ether-benzene solution, which was decanted free of the lithium aluminate, was extracted with three 100 ml. portions of 10% hydrochloric acid. Addition of 400 ml. of 10% sodium hydroxide solution caused the separation of a colorless oil, 7,8-dimethoxy-2,4a-dimethylbenzofuro[2,3-c]-1,2,3,4,4a,9a-hexahydropyridine, which was extracted into three 75 ml. portions of ether. After drying over potassium hydroxide pellets, the ether was removed by distillation. The remaining colorless oil weighed 10.0 g. (85.0% yield).

7,8-dimethoxy - 2,4a-dimethylbenzofuro[2,3-c]-1,2,3,4, 4a, 9a-hexahydropyridine was obtained in the form of a colorless crystalline hydrochloride when a solution of the free base in absolute ethanol was titrated just to the acid side with a solution of anhydrous hydrogen chloride in absolute ethanol and anhydrous ether added to the point of turbidity. The amine hydrochloride, after recrystallization from ethanol-ether melted at 226–228° C. with decomposition.

Analysis.—Calcd. for $C_{15}H_{22}O_3NCl$: C, 60.1; H, 7.40; N, 4.67. Found: C, 60.4; H, 7.51; N, 4.67.

The substitution of a molar equivalent amount of ethyl valerylacetate (II; R=C₄H₉) for ethyl acetoacetate in part *a* of Example 2 and the carrying out of the subsequent reactions as described in Example 2 yields 7,8-dimethoxy-2-methyl-4a-butylbenzofuro[2,3-c]-1,2,3,4,4a,9a - hexahydropyridine (XI; R=C₄H₉, R' and R''=CH₃).

The substitution of a molar equivalent amount of carbethoxymethyl cyclohexyl ketone (II; R=C₆H₁₁) for ethyl acetoacetate in part *a* of Example 2 and the carrying out of the subsequent reactions as described in Example 2 yields 7,8-dimethoxy-2-methyl-4a-cyclohexylbenzofuro-[2,3-c]-1,2,3,4,4a,9a-hexahydropyridine (XI; R=C₆H₁₁, R' and R''=CH₃).

The substitution of a molar equivalent amount of carbethoxymethyl benzyl ketone (II; R=C₆H₅CH₂) for ethyl acetoacetate in part *a* of Example 2 and the carrying out of the subsequent reactions as described in Example 2 yields 7,8 - dimethoxy-2-methyl-4a-benzylbenzofuro[2,3-c]-1,2,3,4,4a,9a - hexahydropyridine (XI; R=C₆H₅CH₂, R' and R''=CH₃).

The substitution of a molar equivalent amount of carbethoxymethyl 2-cyclohexylethyl ketone (II; R=C₆H₁₁CH₂CH₂) for ethyl acetoacetate in part *a* of Example 2 and the carrying out of the subsequent reactions as described in Example 2 yields 7,8-dimethoxy-2-methyl-4a - (2-cyclohexylethyl)benzofuro[2,3-c]-1,2,3,4, 4a, 9a-hexahydropyridine (XI; R=C₆H₁₁CH₂CH₂, R' and R''=CH₃).

The substitution of a molar equivalent amount of ethyl p-toluylacetate (II; R=p-CH₃C₆H₄) for ethyl acetoacetate on part *a* of Example 2 and the carrying out of the subsequent reactions as described in Example 2 yields 7,8-dimethoxy-2-methyl-4a (p-tolyl)-benzofuro[2,3-c]-1, 2,3,4,4a-9a-hexahydropyridine (XI; R=p-CH₃C₆H₄, R' and R''=CH₃).

The substitution of a molar equivalent amount of diethyl sulfate for dimethyl sulfate in part *b* of Example 2 and the carrying out of the subsequent reactions as described in Example 2 yields 7,8-diethoxy-2,4a-dimethylbenzofuro[2,3-c]-1,2,3,4,4a-9a-hexahydropyridine (XI; R=CH₃, R'=C₂H₅, R''=CH₃).

The substitution of a molar equivalent amount of propylamine for methylamine in part *f* of Example 2 and the carrying out of the subsequent reactions as described in Example 2 yields 7,8-dimethoxy-2-propyl-4a-methyl-benzofuro[2,3-c]-1,2,3,4,4a,9a-hexahydropyridine (XI; R and R'=CH₃, R''=C₃H₇).

The substitution of a molar equivalent amount of isobutylamine for methylamine in part *f* of Example 2 and the carrying out of the subsequent reactions as described in Example 2 yields 7,8-dimethoxy-2-isobutyl-4a-methyl-benzofuro-[2,3-c]-1,2,3,4,4a-9a-hexahydropyridine (XI; R and R'=CH₃, R''=(CH₃)₂CH₂CH₂).

I claim:

1. A compound having the formula

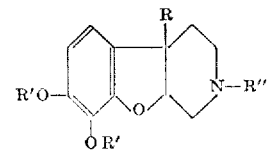

wherein R is a hydrocarbon group free of ethylenic or acetylenic unsaturation and having from one to eight carbon atoms, and R' and R'' are lower-alkyl groups.

2. A compound having the formula

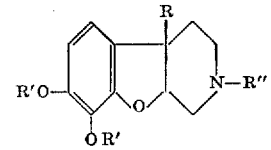

wherein R, R' and R'' are lower-alkyl groups.

3. A compound having the formula

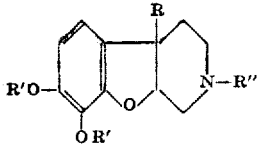

wherein R is a monocyclic aryl hydrocarbon group free of ethylenic or acetylenic unsaturation and having from six to eight carbon atoms, and R' and R'' are lower-alkyl groups.

4. A compound having the formula

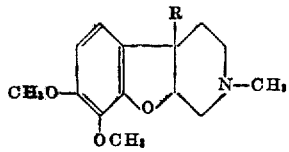

wherein R is a hydrocarbon group free of ethylenic or acetylenic unsaturation and having from one to eight carbon atoms.

5. A compound having the formula

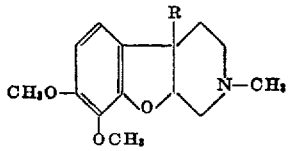

wherein R is a lower-alkyl group.

6. A compound having the formula

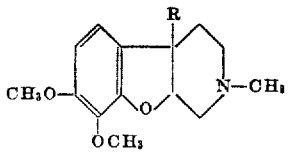

wherein R is a monocyclic aryl hydrocarbon group free of ethylenic or acetylenic unsaturation and having from six to eight carbon atoms.

7. 7,8-dimethoxy-2-methyl-4a-phenylbenzofuro[2,3-c]-1,2,3,4,4a,9a-hexahydropyridine.

8. 7,8-dimethoxy-2,4a-dimethylbenzofuro[2,3-c]-1,2,3,4,4a,9a-hexahydropyridine.

9. A compound having the formula

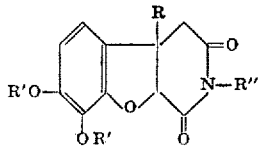

wherein R is a hydrocarbon group free of ethylenic or acetylenic unsaturation and having from one to eight carbon atoms, and R' and R'' are lower-alkyl groups.

10. A compound having the formula

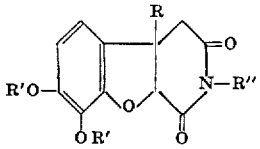

wherein R, R' and R'' are lower-alkyl groups.

11. A compound having the formula

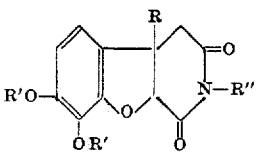

wherein R is a monocyclic aryl hydrocarbon group free of ethylenic or acetylenic unsaturation and having from six to eight carbon atoms, and R' and R'' are lower-alkyl groups.

12. A compound having the formula

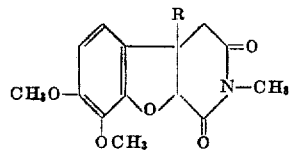

wherein R is a hydrocarbon group free of ethylenic or acetylenic unsaturation and having from one to eight carbon atoms.

13. A compound having the formula

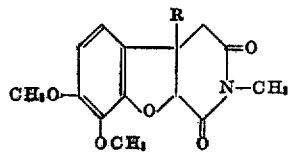

wherein R is a lower-alkyl group.

14. A compound having the formula

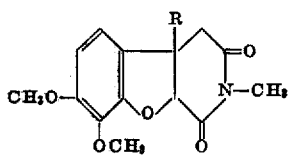

wherein R is a monocyclic aryl hydrocarbon group free of ethylenic or acetylenic unsaturation and having from six to eight carbon atoms.

15. N-methylimide of 2-carboxy-6,7-dimethoxy-3-phenylcoumaran-3-acetic acid.

16. N-methylimide of 2-carboxy-6,7-dimethoxy-3-methylcoumaran-3-acetic acid.

17. The process for the preparation of a compound having the formula

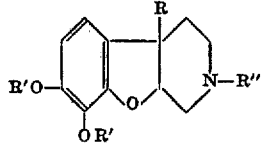

wherein R is a hydrocarbon group free of ethylenic or acetylenic unsaturation and having from one to eight carbon atoms, and R' and R'' are lower-alkyl groups, which comprises heating a 2-(N-lower-alkylcarbamyl)-6,7-di-lower-alkoxy-3-R-coumaran-3-acetic acid, and heating the intermediate N-lower-alkylimide of a 2-carboxy-6,7-di-lower-alkoxy-3-R-coumaran-3-acetic acid thus formed with lithium aluminum hydride in an inert solvent.

18. The process for the preparation of a compound having the formula

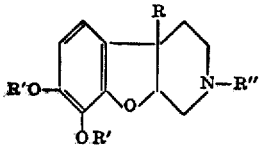

wherein R is a hydrocarbon group free of ethylenic or acetylenic unsaturation and having from one to eight carbon atoms, and R' and R'' are lower-alkyl groups, which comprises heating a N-lower-alkylimide of a 2-carboxy-6,7-di-lower-alkoxy-3-R-coumaran-3-acetic acid in an inert solvent with lithium aluminum hydride.

19. The process for the preparation of a compound having the formula

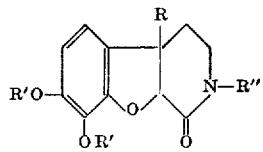

wherein R is a hydrocarbon group free of ethylenic or acetylenic unsaturation and having from one to eight carbon atoms, and R' and R" are lower-alkyl groups, which comprises heating a 2-(N-lower-alkylcarbamyl)-6,7-dilower-alkyl-3-R-coumaran-3-acetic acid.

20. The process for the preparation of 7,8-dimethoxy-2 - methyl - 4a - phenylbenzofuro[2,3-c]-1,2,3,4,4a,9a-hexahydropyridine which comprises heating 2-(N-methylcarbamyl)-6,7-dimethoxy-3-phenylcoumarin-3-acetic acid and heating the intermediate N-methylimide of 2-carboxy-6,7-dimethoxy-3-phenyl-coumarin-3 - acetic acid thus formed with lithium aluminum hydride in an inert solvent.

21. The process for the preparation of 7,8-dimethoxy-2 - methyl - 4a - phenylbenzofuro[2,3-c] - 1,2,3,4,4a,9a - hexahydropyridine which comprises heating the N-methylimide of 2 - carboxy-6,7-dimethoxy-3-phenylcoumarin-3-acetic acid in an inert solvent with lithium aluminum hydride.

22. The process for the peparation of the N-methylimide of 2 - carboxy-6,7-dimethoxy-3-phenylcoumarin-3-acetic acid which comprises heating 2-(N-methylcarbamyl)-6,7-dimethoxy-3-phenylcoumarin-3acetic acid.

23. The process for the preparation of 7,8-dimethoxy-2,4a - dimethylbenzofuro[2,3-c] - 1,2,3,4,4a,9a-hexahydropyridine which comprises heating 2-(N-methylcarbamyl)-6,7-dimethoxy-3-methylcoumarin-3acetic acid, and heating the intermediate N-methylimide of 2-carboxy-6,7-dimethoxy-3-methylcoumarin - 3 - acetic acid thus formed with lithium aluminum hydride in an inert solvent.

24. The process for the preparation of 7,8-dimethoxy-2,4a-dimethylbenzofuro[2,3-c]-1,2,3,4,4a,9a - hexahydropyridine which comprises heating the N-methylimide of 2-carboxy-6,7-dimethoxy-3-methylcoumarin-3-acetic acid in an inert solvent with lithium aluminum hydride.

25. The process for the preparation of the N-methylimide of 2-carboxy-6,7-dimethoxy-3-methylcoumarin-3-acetic acid which comprises heating 2-(N-methylcarbamyl)-6,7-dimethoxy-3-methylcoumarin-3-acetic acid.

References Cited in the file of this patent

UNITED STATES PATENTS 2,589,378    Henecka _____ Mar. 18, 1952

OTHER REFERENCES

Burger et al.: Journal of the American Chemical Society, vol. 67, pages 566–569, 1945.

UNITED STATES PATENT OFFICE
CERTIFICATE OF CORRECTION

Patent No. 2,809,201                                            October 8, 1957

Charles Frederick Koelsch

It is hereby certified that error appears in the printed specification of the above numbered patent requiring correction and that the said Letters Patent should read as corrected below.

Column 3, line 45, for "190-195.5° C." read -- 190-191.5° C. --.

Signed and sealed this 26th day of November 1957.

(SEAL)
Attest:

KARL H. AXLINE
Attesting Officer

ROBERT C. WATSON
                                                                                                                                                                        Commissioner of Patents